Oct. 25, 1927.

J. L. ECHANIZ ET AL 1,647,038

WEIGHING MACHINE

Filed Dec. 9, 1924

Inventors
J. L. Echaniz
F. G. Mansilla
By Marks & Clerk Attys.

Oct. 25, 1927.

J. L. ECHANIZ ET AL 1,647,038

WEIGHING MACHINE

Filed Dec. 9, 1924 4 Sheets-Sheet 4

Inventors
J. L. Echaniz
F. G. Marsilla
By Markos & Clark Attys.

Patented Oct. 25, 1927.

1,647,038

UNITED STATES PATENT OFFICE.

JOSE LOPEZ ECHANIZ AND FULGERIO GARCIA MANSILLA, OF BUENOS AIRES, ARGENTINA, ASSIGNORS OF ONE-THIRD TO MANUEL LOPEZ ECHANIZ, ONE-THIRD TO JOSE LOPEZ ECHANIZ, AND ONE-THIRD TO PRUDENCIA GARCIA MANSILLA, ALL OF BUENOS AIRES, ARGENTINA.

WEIGHING MACHINE.

Application filed December 9, 1924. Serial No. 754,837.

This invention relates to improvements in scales, and especially to a new and improved automatic recording scale, having for its principal object the weighing of bodies or objects in uniform movement over a series of transporting rollers. Since it is impossible, under such circumstances, to note down the weights in the usual form on account of the speed with which such weights are taken, this scale is provide with a mechanism which permits the registration of the weights and the counting and recording of the number of weighing operations realized, all of which is done automatically. At the same time, and in order to avoid the effects of possible disturbances or perturbations during the weighing process, another object of the invention is an accessory device for automatically engaging and disengaging the principal beam or lever of the scale at the opportune moments.

This weighing machine of our invention is composed of three essential parts, as follows: (1) a rigid wooden or other frame with a series of conveying rollers; (2) an ordinary spring balance or scale installed on the said frame; (3) a second frame provided with the necessary recording and counting mechanisms.

We will now describe the invention with reference to the accompanying drawings, in which:—

Figure 2:
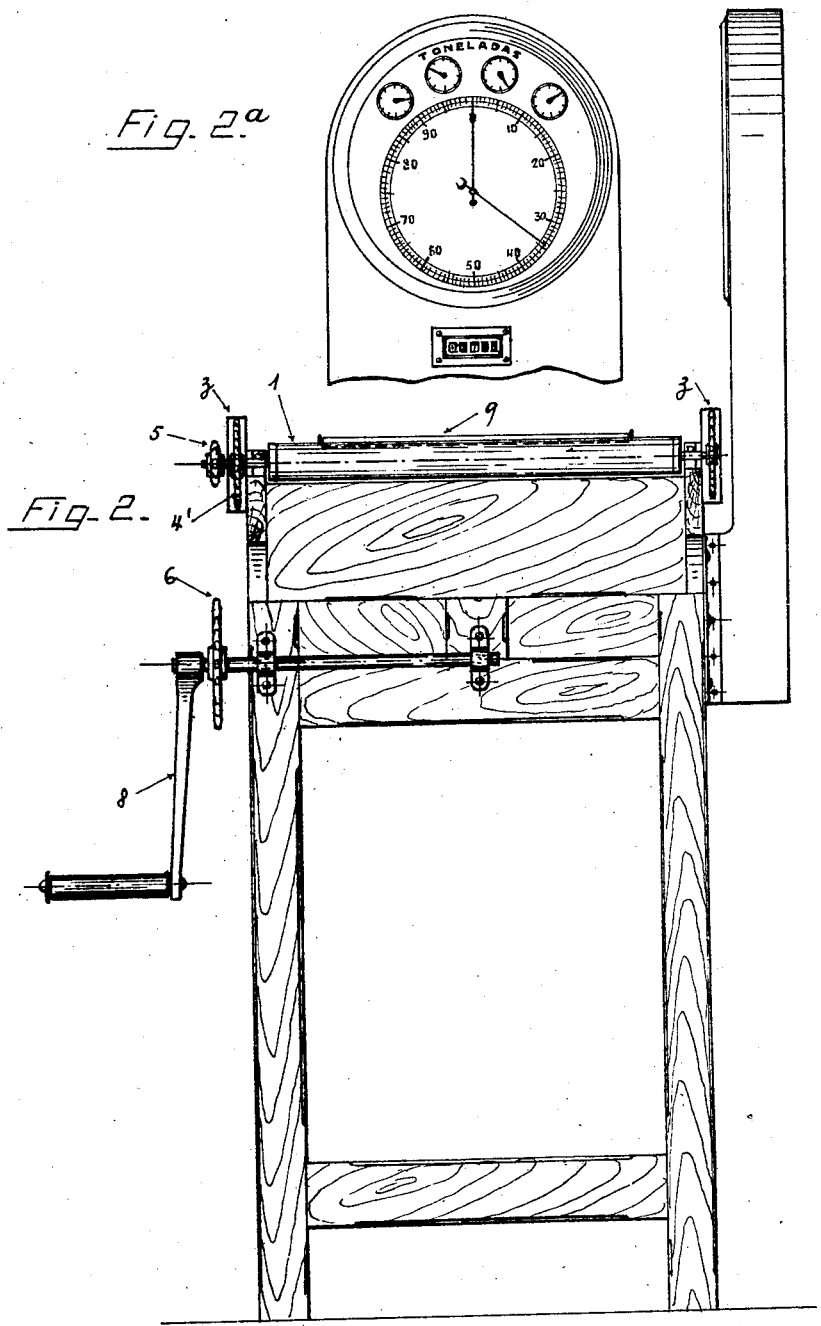
Fig. 2 is a side view of the machine shown in Fig. 1.
Figure 3:
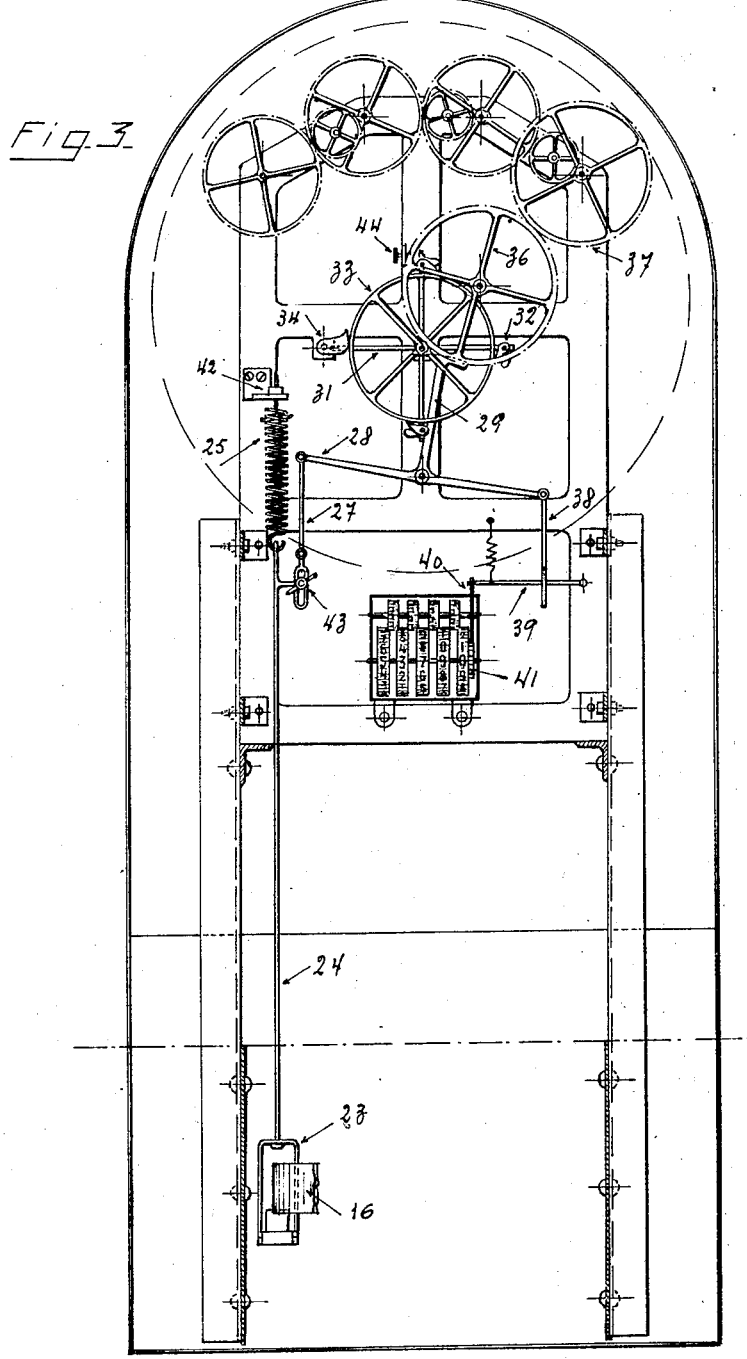
Figure 4:
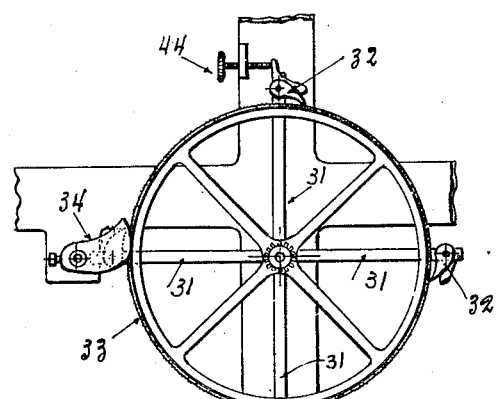
Figure 4A:
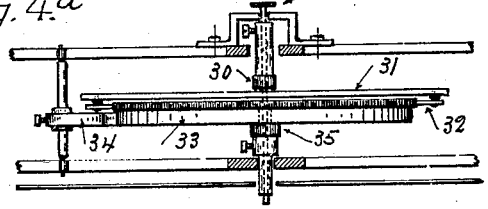
Figure 5:
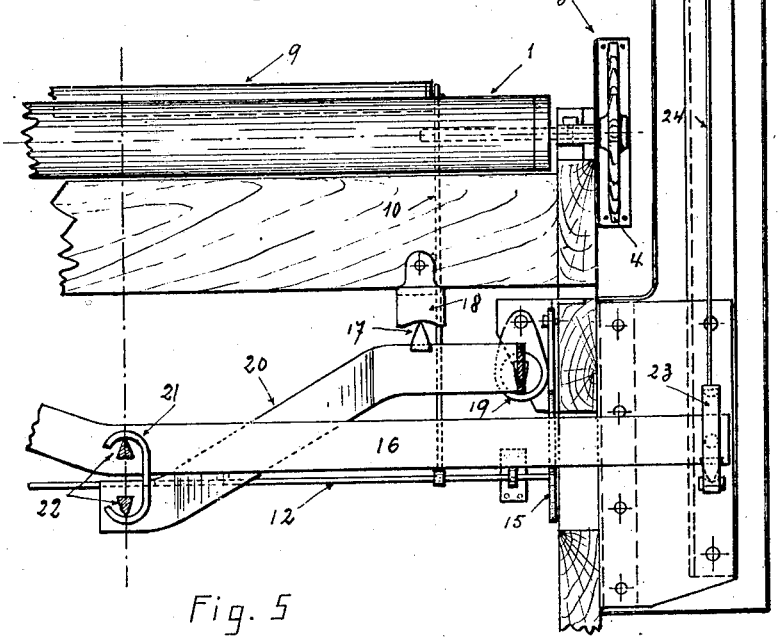

Fig. 2ª is a front view of the indicating dials;

Fig. 3 is an elevation of the weight recording mechanism;

Fig. 4 is a detail of a part of the recording mechanism;

Fig. 4ª is a top view of the detail shown in Fig. 4;

Fig. 5 is a vertical section drawn on the upright symmetrical axis of Fig. 3.

Figure 1:
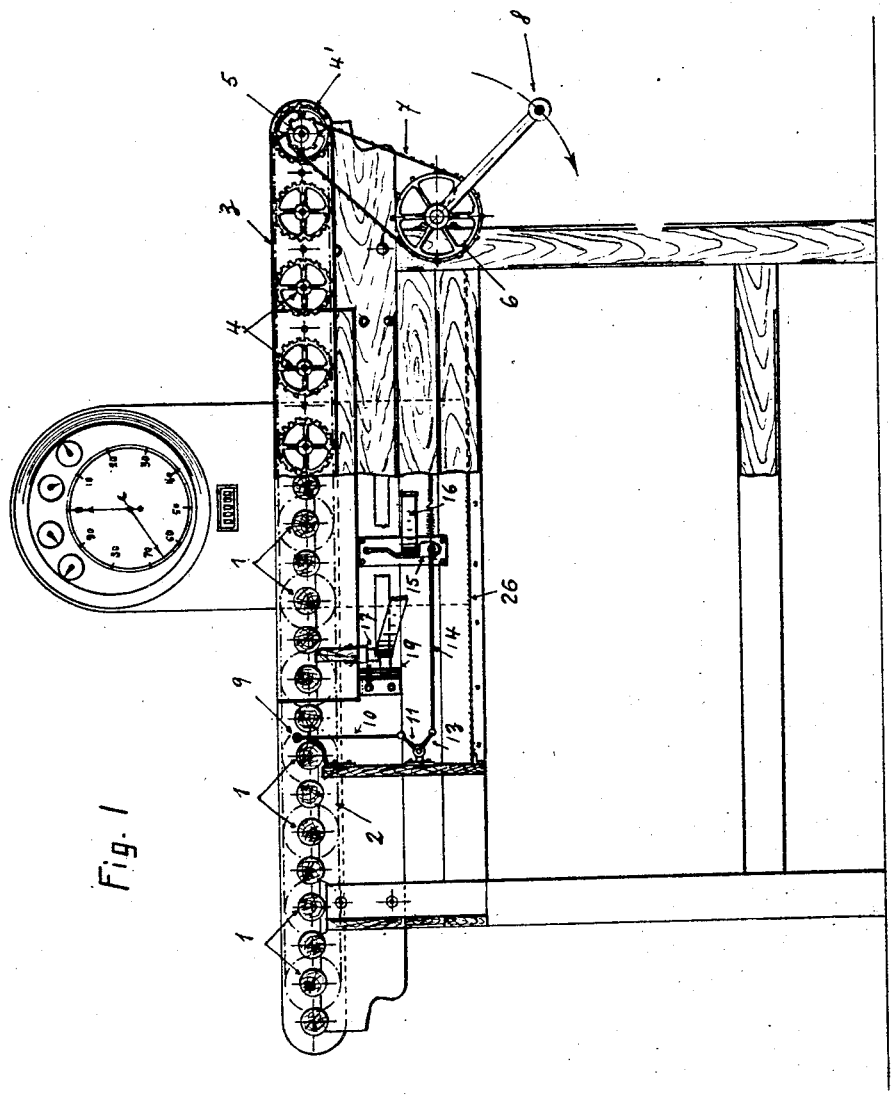
Fig. 1 is a front elevation, partially in section, of a scale or conveying and weighing machine incorporating the present invention.

The scales to which the several figures are drawn are as follows: Fig. 1, 1:12; Fig. 2, 1:8; Figs. 3 and 5, 1:4; and Fig. 4, 1:2.

Like parts are represented by like numbers in all the figures.

Referring now to the said figures, the set of rollers 1, (Figs. 1, 2 and 3) is for the purpose of conveying the objects to be weighed, causing them to pass over the weighing platform, also constituted by rollers. For that purpose, the bodies to be weighed are fed to the weighing machine at the left hand end of the frame, and after being weighed they are delivered at the right hand end. The rollers 1 are moved by means of chains 2 which run in the metallic housings 3, and which actuate the sprocket wheels 4 secured to the ends of the rollers 1. In Fig. 1 the symmetrical axis only of the chain is represented.

In front of the scale, the odd rollers only have gear wheels, (counting from the right) and on the opposite side the even rollers. The first right hand roller moves the second by means of small sprocket wheels and chain, not shown in the figures, and the second is the drive wheel for all the even wheels of the series.

The chain 2 receives its movement from the sprocket wheel 4' mounted on the same shaft with the pinion 5. This pinion is moved by the gear wheel 6 and by the chain 7. To the same shaft with the wheel 6 a crank 8 is applied for the application of power for moving the train of rollers. When a weighing machine is to operate coupled to a conveyor belt of the usual type, the crank 8 will be substituted by a pulley of the proper diameter.

The bodies or objects to be weighed, before reaching the platform (by which term the upper surface of the moving rollers will be hereinafter called) by their own weight actuate the auxiliary roller 9 (Figs. 1, 2 and 5), which by means of the bar 10 (and its mate at the opposite end) and of a small lever 11 (also with its mate) causes the shaft 12 to revolve (Fig. 5) and the said shaft, through the small crank 13 and the bar 14, deviates to the left hand the part 15, disengaging the principal lever 16. This operation being effected, the platform is in readiness to move freely under the influence of the weight.

When the objects which have been weighed pass off from the platform, a device identical to the one just described, or a spring, as shown in Figure 1, deviates to the right the part 15 re-engaging the lever 16. In this way the blows which the frame might otherwise receive when the objects to be weighed fall on the rollers 1 of the platform, are prevented from being communicated to the recording mechanism.

In the example illustrated the weighing capacity of the machine as indicated by the graduation of the principal circle of the dial shown in Fig. 2, is limited to one hundred kilogrammes for each weighing operation.

The platform (Figs. 1 and 5) just as in scales in common use, rests on steel knife edge supports 17 socketed at convenient points of the levers, by means of bearings 18, also of steel. The levers are hung from the frame by steel links 19 on which the steel knife edges rest, which are carried by the ends of the levers.

The smaller lever 20 (Fig. 5) transmits to the principal lever 16 the part of the weight which it receives from the platform, through the suspension 21 which unites the levers by the corresponding knife edges 22, both being made of steel. In its turn, the lever 16 transmits through the suspension 23 to the traction bar 24 and through the latter to the spring 25, the weight of the body or object placed on the platform, but reduced in weight at the rate of ten to one, which we have adopted for this type of scale; the spring being duly secured to the frame of the recording apparatus.

In order to protect the levers, knife edges, etc., against any intentional disturbance, and to protect the mechanism against access of unauthorized persons, there is placed in the lower part of the housing of the frame (Fig. 1), a perforated metallic or other plate 26, properly secured to the said frame.

The weight recording apparatus (Figs. 3, 4 and 5), consists of a metallic frame fixed solidly to the principal frame, in which the weight recording and counting mechanisms are placed. The recording of the weights and the counting of the weighing operations are done in this machine automatically, as follows: When a body or object passes over the platform of the scales (Figs. 3, 4 and 5), the levers 20 and 16 will transmit, as above stated, one-tenth of the weight to the spring 25, which will be lengthened in proportion to that weight; and in the downward movement of the bar 24, on account of the tractive power exercised, it will draw with it simultaneously the bar 27 connected thereto, and the latter in its turn will move in a certain angle the lever of the first class 28 and the toothed sector 29 integral therewith. This sector engages the pinion 30 concentric with and fixed to the crossed vanes 31, participating in the movement of the latter. The vanes carry at their ends the ratchets 32 the purpose of which is to impel, in their movements from left to right, the wheel 33 which is toothed in a part only of the width of its rim and which is concentric with the above mentioned pinion and vanes. During this movement the vane 31 and the wheel 33 describe the same angle on account of the movement which the bar 24 has communicated during its descent to the combination formed by the bar 27, lever 28, sector 29, pinion 30, vanes 31, ratchets 32 and wheel 33.

The rotation of the wheel 33 being proportional to the elongation of the spring 24, the needle carried by the hollow shaft of the wheel 33 will indicate in the principal graduated circle of the dial (Figs. 1 and 2), the weight of the body or object which is passing over the platform. When the body which has been weighed comes away from the platform, the spring 24 tends to recover its original length, or equilibrium, thus provoking a movement in the opposite direction of the combination formed by the bar 27, lever 28, sector 29, pinion 30, vanes 31, ratchets 32, but not of the wheel 33, this being prevented, in spite of the friction of the ratchets 32 on the wheel 33, by the brake 34 which commences to actuate from the moment in which the wheel 33 stops after finishing its direct movement, impelled by the ratchets 32.

The shaft of the vanes 31, which also carry at one end another needle the object of which is to indicate the amount of each weighing operation separately, starting from and returning to 0 as usual in spring scales, passes through the hollow shaft of the wheel 33.

We will now describe the device for registering the number of revolutions of the wheel 33 by the continued passage of the bodies or objects to be weighed over the platform, or its equivalent, the accumulation of the weights. For this purpose, the wheel 33 carries also another pinion 35, concentric and integral with the same. This pinion through the gearing 36 revolves the gearing 37 which has a diameter ten times greater than that of the former; and consequently, for each ten revolutions of the wheel 33, or of its needle on the graduated circle there will be one corresponding revolution of the gear wheel 37, or of its needle, integral thereto, over the first graduated circle, at the right of the dial, (Figs. 1 and 2). In the same manner the revolutions of the remaining needles will be recorded by means of the series of gears (Fig. 3) placed in the upper part of the frame.

In this manner, the principal circle of the dial being graduated in one hundred units or kilogrammes and fractions thereof, and the decreasing relation being ten to one in the number of turns of the recording instrument, taken from right to left, when the principal needle has made ten turns, the first needle at the right will have made one turn, which represents one ton; when the principal needle has made one hundred turns the first needle at the right will have made ten, and the next following one turn, which represents ten tons; when the principal needle has made one thousand turns, the first one at the right will have made one hundred, and the second ten and the third one turn, which represents one hundred tons; and finally, when the principal needle has made ten thousand turns, the others, and in the order mentioned, will make one thousand, one hundred, ten, and one turn, respectively, this latter representing one thousand tons. This cycle will be repeated indefinitely. The circles corresponding to the small needles are divided in ten equal sectors.

The mechanism for counting the number of weighing operations (Figs. 3 and 5), is of a well known form and operation, and is actuated during the ascending movement of the bar 24, which on moving the lever 28 through the bar 38, lever 39 and stem 40, causes one tooth of the pinion 41 to move forward at each oscillation. This pinion is fixed to its shaft together with the first numbered disk to the right. All the other disks of the counting mechanism, as well as the small gear wheels of the upper shaft, are of absolutely free movement. The backward movement of the principal shaft of this counting apparatus, is prevented by the corresponding ratchet.

For the necessary corrections and adjustments corresponding to the mechanisms of the recording apparatus, there are provided the screws 42, 43, 44 and 45. The entire mechanism described is enclosed in a metallic housing, (Figs. 1, 2, 3 and 5), being therefore protected against intentional manipulation which might be made for the object of producing defective weights. The housing or case has a hand-hole and cover on its rear side, provided with the necessary locking devices.

The recording scale herein described is for the principal purpose of weighing products such as wheat, oats, maize, linseed, coffee, etc., in bags. The advantages of this scale or weighing machine over those heretofore known designed for the same purpose, among others are the following: (1) greater speed in the weighing operations without sacrifice of precision in the results; (2) elimination of the employee for noting down the weights of the products, and consequently, the elimination of the factor of human error in the annotations; (3) suppression of all discussion regarding the weights and the total sum, between the delivering and receiving parties; (4) decrease of the number of employees to operate the scale, and consequently economy in wages for the same amount of products weighed; (5) better treatment of the bags or containers on account of its not being necessary to throw them from the height of the shoulder of the workman, as occurs in the use of common scales.

It is understood that the form of construction hereinbefore described and illustrated in the accompanying drawings, is not exclusive, since as always occurs in practice, certain modifications of details may occur to experienced persons without thereby departing from the spirit of the invention as set forth in the appended claims.

Having thus described our invention, what we claim and desire to protect by Letters Patent of the United States, is:

1. In a combined conveying and weighing machine, the combination of a rigid frame, a scale, a set of conveying rollers mounted partly on said rigid frame and partly on a vertically movable frame forming the platform of said scale, weighing mechanism in connection with the said movable frame, weight indicating dials mounted on said rigid frame, and means to move the pointers of said weight indicating dials in proportion to the weight resting on the said movable frame, substantially as described.

2. A combined conveying and weighing machine of the class claimed in claim 1, in which the means for the transmission of rotary movement to the conveying rollers comprise a source of power, such as the crank 8, mounted on a sprocket wheel 6 which actuates through the chain 7 a pinion 5 mounted on the same shaft with the sprocket wheel 4' which by means of a chain and sprocket gearing actuates on one side of the machine the odd numbered rollers, said shaft of the pinion 5 being provided at its opposite end with a similar system which actuates the even numbered rollers, substantially as described and illustrated.

3. In a combined conveying and weighing machine as claimed in claim 1, the combination therewith of a device to engage and disengage the principal lever of the scale and thereby prevent undue trepidation of the mechanism when the object to be weighed falls on the scale, said device consisting of an auxiliary roller to be actuated by the weight of the said object previously to impinging on the platform of the scale, and a set of levers actuated by the downward movement of the said auxiliary roller to engage the principal lever of the scale so as to prepare it for the weighing operation, and a similar auxiliary roller and set of levers so arranged as to lock and hold the said principal lever against movement after the body to be weighed has left the platform of the scale, substantially as described.

4. In a combined conveying and weighing machine as claimed in claim 1, the combination therewith of a device for recording the total amounts of the successive weighing operations, comprising the bar 27 connected to the lever 28 forming integral part with the toothed sector 29 which actuates by means of the pinion 30 the crossed vanes 31 which latter by means of the ratchets 32 actuates the wheel 33 concentric with the vanes 31, the shaft on which the vanes 31 are mounted passing through the hollow shaft of the said wheel 33 and both shafts carrying pointers to indicate on a dial the amounts of weight, the pointer carried by the shaft of the vanes showing the amount of each successive weighing operation and then returning to "zero" while the pointer mounted on the shaft of the wheel 33 is prevented from so returning by the brake 34 so that it continues to record the total weight of the successive operations combined, and a combination of gear represented by the pinion 35 and wheels 36 and 37 by means of which the wheel 33 transmits movements to a system of pointers and dials so geared as to record respectively the units of tons, substantially as described and illustrated.

5. In a combined conveying and weighing machine as claimed in claim 1, the combination therewith of a device for recording the number of weighing operations effected, substantially as described.

Signed at Buenos Aires, Argentina, this 17th day of November, A. D. 1924.

JOSE LOPEZ ECHANIZ.
FULGERIO GARCIA MANSILLA.